US009665895B2

(12) United States Patent
Alston

(10) Patent No.: US 9,665,895 B2
(45) Date of Patent: May 30, 2017

(54) TECHNOLOGIES FOR VIDEO-BASED COMMERCE

(71) Applicant: Christopher Renwick Alston, Vienna, VA (US)

(72) Inventor: Christopher Renwick Alston, Vienna, VA (US)

(73) Assignee: MOV, INC., Vienna, VA (US)

(*) Notice: Subject to any disclaimer, the term of this patent is extended or adjusted under 35 U.S.C. 154(b) by 0 days.

(21) Appl. No.: 14/457,612

(22) Filed: Aug. 12, 2014

(65) Prior Publication Data
US 2015/0046280 A1 Feb. 12, 2015

Related U.S. Application Data

(60) Provisional application No. 61/865,130, filed on Aug. 12, 2013.

(51) Int. Cl.
G06Q 30/06 (2012.01)
H04L 29/06 (2006.01)
H04N 21/254 (2011.01)
H04N 21/258 (2011.01)
H04W 4/02 (2009.01)
H04L 29/08 (2006.01)

(52) U.S. Cl.
CPC ....... G06Q 30/0609 (2013.01); H04L 65/403 (2013.01); H04L 67/18 (2013.01); H04N 21/2542 (2013.01); H04N 21/25841 (2013.01); H04W 4/023 (2013.01); G06Q 30/0601 (2013.01)

(58) Field of Classification Search
CPC .......................................... G06Q 30/06–30/08

USPC .......................................... 705/26, 26.1–27.2
See application file for complete search history.

(56) References Cited

U.S. PATENT DOCUMENTS

| 5,099,337 | A | * | 3/1992 | Cury | ............................. 386/285 |
| 5,960,411 | A | | 9/1999 | Hartman et al. | |
| 7,113,917 | B2 | | 9/2006 | Jacobi et al. | |
| 7,191,117 | B2 | * | 3/2007 | Kirby et al. | ...................... 704/9 |
| 7,428,501 | B2 | | 9/2008 | Dinwoodie | |

(Continued)

FOREIGN PATENT DOCUMENTS

EP 2680256 A1 * 1/2014

OTHER PUBLICATIONS

US 8,776,178, 07/2014, Cassidy et al. (withdrawn)
(Continued)

Primary Examiner — Ethan D Civan
Assistant Examiner — Ming Shui
(74) Attorney, Agent, or Firm — Buchanan Ingersoll & Rooney PC

(57) ABSTRACT

A computer system receiving audiovisual information, geographic information, and a seller term from a seller computer, said audiovisual information disclosing a seller offer at a seller location captured via said seller computer, said geographic information associated with said location, said audiovisual information associated with said geographic information, said system providing said audiovisual information to a buyer computer for an acceptance of said offer via said buyer computer, said system conditioning said acceptance upon said buyer computer being geographically positioned in compliance with said term based on said geographic information.

22 Claims, 7 Drawing Sheets

(56) References Cited

U.S. PATENT DOCUMENTS

| | | | |
|---|---|---|---|
| 7,702,545 | B1 | 4/2010 | Compton et al. |
| 7,783,526 | B1 | 8/2010 | Cohen et al. |
| 7,991,646 | B2 | 8/2011 | Lewis et al. |
| 8,060,608 | B2* | 11/2011 | Wang et al. .................. 709/224 |
| 8,095,377 | B2* | 1/2012 | Resato et al. .................. 705/1.1 |
| 8,307,286 | B2 | 11/2012 | Sterner et al. |
| 8,326,691 | B1 | 12/2012 | Rabenold et al. |
| 8,335,723 | B2 | 12/2012 | Tedesco et al. |
| 8,341,036 | B2 | 12/2012 | Hartman et al. |
| 8,463,656 | B2 | 6/2013 | Pandurangan |
| 8,503,995 | B2 | 8/2013 | Ramer et al. |
| 8,595,085 | B2 | 11/2013 | Tedesco et al. |
| 8,694,379 | B2 | 4/2014 | Wiseman et al. |
| 8,706,558 | B2 | 4/2014 | Scheinfeld et al. |
| 8,706,562 | B2 | 4/2014 | Scheinfeld et al. |
| 8,737,974 | B1 | 5/2014 | Sennett et al. |
| 8,751,326 | B2 | 6/2014 | Grove et al. |
| 8,762,221 | B2 | 6/2014 | Chatter et al. |
| 8,776,110 | B1 | 7/2014 | Tenneti |
| 8,776,121 | B2 | 7/2014 | Gossweiler, III |
| 8,776,142 | B2 | 7/2014 | Sezan et al. |
| 8,776,154 | B2 | 7/2014 | Kim et al. |
| 8,776,171 | B2 | 7/2014 | Piersol |
| 8,776,186 | B2 | 7/2014 | Resch et al. |
| 8,776,216 | B2 | 7/2014 | Boccon-Gibod et al. |
| 8,776,219 | B2 | 7/2014 | Bisso et al. |
| 2001/0034697 | A1 | 10/2001 | Kaen |
| 2001/0047329 | A1* | 11/2001 | Ashby .............................. 705/39 |
| 2002/0056119 | A1 | 5/2002 | Moynihan |
| 2002/0120554 | A1 | 8/2002 | Vega |
| 2002/0169705 | A1 | 11/2002 | Gutierrez et al. |
| 2003/0046187 | A1 | 3/2003 | Yu |
| 2003/0078858 | A1 | 4/2003 | Angelopoulos et al. |
| 2004/0193529 | A1 | 9/2004 | Asher et al. |
| 2005/0027641 | A1 | 2/2005 | Grove et al. |
| 2005/0177387 | A1 | 8/2005 | Mojsa |
| 2006/0031177 | A1* | 2/2006 | Rule .............................. 705/80 |
| 2006/0230123 | A1 | 10/2006 | Simmons et al. |
| 2007/0106570 | A1 | 5/2007 | Hartman et al. |
| 2007/0189708 | A1 | 8/2007 | Lerman et al. |
| 2007/0203911 | A1 | 8/2007 | Chiu |
| 2007/0294622 | A1 | 12/2007 | Sterner et al. |
| 2008/0234048 | A1 | 9/2008 | Gottlieb |
| 2008/0288338 | A1 | 11/2008 | Wiseman et al. |
| 2009/0099951 | A1 | 4/2009 | Pandurangan |
| 2009/0106127 | A1 | 4/2009 | Purdy et al. |
| 2009/0281926 | A1 | 11/2009 | Lin-Hendel |
| 2009/0327894 | A1 | 12/2009 | Rakib et al. |
| 2011/0004660 | A1 | 1/2011 | Battle |
| 2011/0022500 | A1 | 1/2011 | Scheinfeld et al. |
| 2011/0052144 | A1 | 3/2011 | Abbas et al. |
| 2011/0093349 | A1* | 4/2011 | Drescher ................ G06Q 30/00 705/14.73 |
| 2011/0125605 | A1 | 5/2011 | Chatter et al. |
| 2011/0137753 | A1 | 6/2011 | Moehrle |
| 2011/0231260 | A1 | 9/2011 | Price |
| 2011/0270717 | A1 | 11/2011 | MacDonald Korth et al. |
| 2012/0005047 | A1 | 1/2012 | Hughes |
| 2012/0011019 | A1 | 1/2012 | Wakim |
| 2012/0042277 | A1 | 2/2012 | Lin-Hendel |
| 2012/0078754 | A1 | 3/2012 | Wiseman et al. |
| 2012/0166303 | A1 | 6/2012 | Godwin et al. |
| 2012/0179548 | A1* | 7/2012 | Sun et al. .................. 705/14.58 |
| 2012/0296739 | A1 | 11/2012 | Cassidy et al. |
| 2013/0013465 | A1 | 1/2013 | Scheinfeld et al. |
| 2013/0073389 | A1 | 3/2013 | Heath |
| 2013/0073400 | A1 | 3/2013 | Heath |
| 2013/0085896 | A1 | 4/2013 | Hartman et al. |
| 2013/0132225 | A1 | 5/2013 | Asher et al. |
| 2013/0144903 | A1 | 6/2013 | Andrews et al. |
| 2013/0179292 | A1 | 7/2013 | Pandurangan |
| 2013/0202154 | A1 | 8/2013 | Hirano |
| 2013/0325664 | A1 | 12/2013 | Alegre et al. |
| 2014/0081806 | A1 | 3/2014 | Tedesco et al. |
| 2014/0156438 | A1 | 6/2014 | Beavers |

OTHER PUBLICATIONS

YouTube, https://web.archive.org/web/20110610213955/http://www.youtube.com/watch?v=6ATw1f_qcEg&feature=dir, Jun. 10, 2011.*

Crowell, Using Video to Improve the E-Commerce Shopping Experience, downloaded from the internet at http://video-commerce.org/2011/12/user-experience-video-ecommerce/, published on Dec. 16, 2011, 5 pages.

Crum, Facebook is Buying Video Ad Tech Company LiveRail, downloaded from the internet at http://www.webpronews.com/facebook-is-buying-video-ad-tech-company-liverail-2014-07, published Jul. 2, 2014, 2 pages.

Dickey, Any Video Can Be Interactive—and Soon, They All Will Be, downloaded from the internet at http://mashable.com/2014/07/01/fuisz-interactive-online-videos/, published on Jul. 1, 2014, 4 pages.

Fach, How to Patent Software, downloaded from the internet at http://www.youtube.com/watch?v=YA4a1Mu31do, published on Mar. 31, 2012, 3 pages.

Foster, Video E-Commerce: Beyond the Experimentation Stage, downloaded from the internet at http://www.emarketer.com/Article.aspx?R=1007695&RewroteTitle=1, published on May 14, 2010, 4 pages.

Foster, Video Commerce, downloaded from the internet at http://www.slideshare.net/liveclicker/video-commerce-and-ecommerce-video-disruptive-innovations-in-ecommerce-presentation, published on Jan. 24, 2009, 9 pages.

Heine, Zappos.com Rolls Out Clickable Product Videos, downloaded from the internet at http://www.clickz.com/clickz/news/1694325/zapposcom-rolls-out-clickable-product-videos, published on Nov. 30, 2009, 10 pages.

Hof, YouTube Debuts Click-to-Buy: E-Commerce for Video, http://www.businessweek.com/the_thread/techbeat/archives/2008/10/post_9.html, published on Oct. 7, 2008, 15 pages.

Lawler, Video Discovery Startup Showyou Launches Channel Platform, Unveils a Revenue Model, TechCrunch, downloaded from the internet at http://techcrunch.com/2013/06/06/showyou-channels/?icid=tc_art, published Jun. 6, 2013, 4 pages.

Lombardo, eTail East: The Intersection of Social eCommerce, Mobile eCommerce & Video, downloaded from the internet at http://blog.brightcove.com/en/2010/08/etail-east-intersection-social-ecommerce-mobile-ecommerce-video, published Aug. 16, 2010, 3 pages.

Moser, Liveclicker Helps DHC Connect With Customers Through Video, downloaded from the internet at http://video-commerce.org/2014/01/liveclicker-helps-dhc-connect-with-customers-through-video/, published on Jan. 17, 2014, 3 pages.

Nelson, Swipe Right to Buy Dress: The App That's Like Tinder for Shopping, downloaded from the internet at http://mashable.com/2014/07/18/kwoller-tinder-for-shopping/, published Jul. 19, 2014, 4 pages.

Robertson, Using Web Video throughout the Ecommerce Purchase Funnel, downloaded from the internet at http://pt.slideshare.net/reelseo/using-web-video-throughout-the-ecommerce-purchase-funnel, published on Sep. 2, 2011, 5 pages.

Rosensteel, Will Video Be the Next Generation in E-Commerce Product Reviews?, downloaded from the internet at http://www.forbes.com/sites/seanrosensteel/2012/05/30/will-video-be-the-next-generation-in-e-commerce-product-reviews/, published on May 30, 2012, 3 pages.

Shu, Mobile Video Consumption is Increasing Dramatically in China, TechCrunch, downloaded from the internet at http://techcrunch.com/2013/08/19/wandoujia-videostats/, published on Aug. 19, 2013, Sky, State of Video in e-Commerce, downloaded from the internet at http://www.slideshare.net/sundaysky/sunday-skyppt-researchreportq2slideshare, published on Oct. 6, 2010, 4 pages.

Thibeault, Why Video is So Important to the Future of Marketing, downloaded from the internet at http://www.reelseo.com/video-important-future-marketing/, published on Jul. 22, 2013, 7 pages.

(56) References Cited

OTHER PUBLICATIONS

Tolman, The Power of Using Video on Your Ecommerce Store, downloaded from the internet at http://www.mivamerchant.com/blog/the-power-of-using-video-on-your-ecommerce-store, published Mar. 13, 2014, 8 pages.
YouTube Monetization—How Much Does it Pay?, Warrior Forum, downloaded from the internet at http://www.warriorforum.com/social-media/623402-youtube-monetization-how-much-does-pay.html, posted Jun. 23, 2012, 9 pages.
Wilson, downloaded from the internet at http://www.pcmag.com/article2/0,2817,2387719,00.asp, published on Jun. 28, 2011, 6 pages.
Will video ecommerce be the next big step for retail?, Nichesuite, downloaded from the internet at http://nichesuiteseo1.wordpress.com/2013/01/11/will-video-ecommerce-be-the-next-big-step-for-retail/, published on Jan. 11, 2013, 3 pages.
Zaroban, JoyUs.com: Shopping via video, internet Retailer, downloaded from the internet at http://www.internetretailer.com/2012/11/27/shopping-video, published Nov. 27, 2012, 2 pages.
Bhunje, E-Commerce, The Geek, http://theegeek.com/e-commerce/ downloaded from the Internet Archive at Wayback Machine, snapshot captured Jun. 20, 2013, 5 pages.
Movv First Video Commerce App, http://www.movv.com/, downloaded from the Internet Archive at Wayback Machine, snapshot captured May 17, 2014, 1 page.
International Search Report and Written Opinion dated Nov. 26, 2014 in related PCT Application No. PCT/US14/50690 filed Aug. 12, 2014 (8 pages).

* cited by examiner

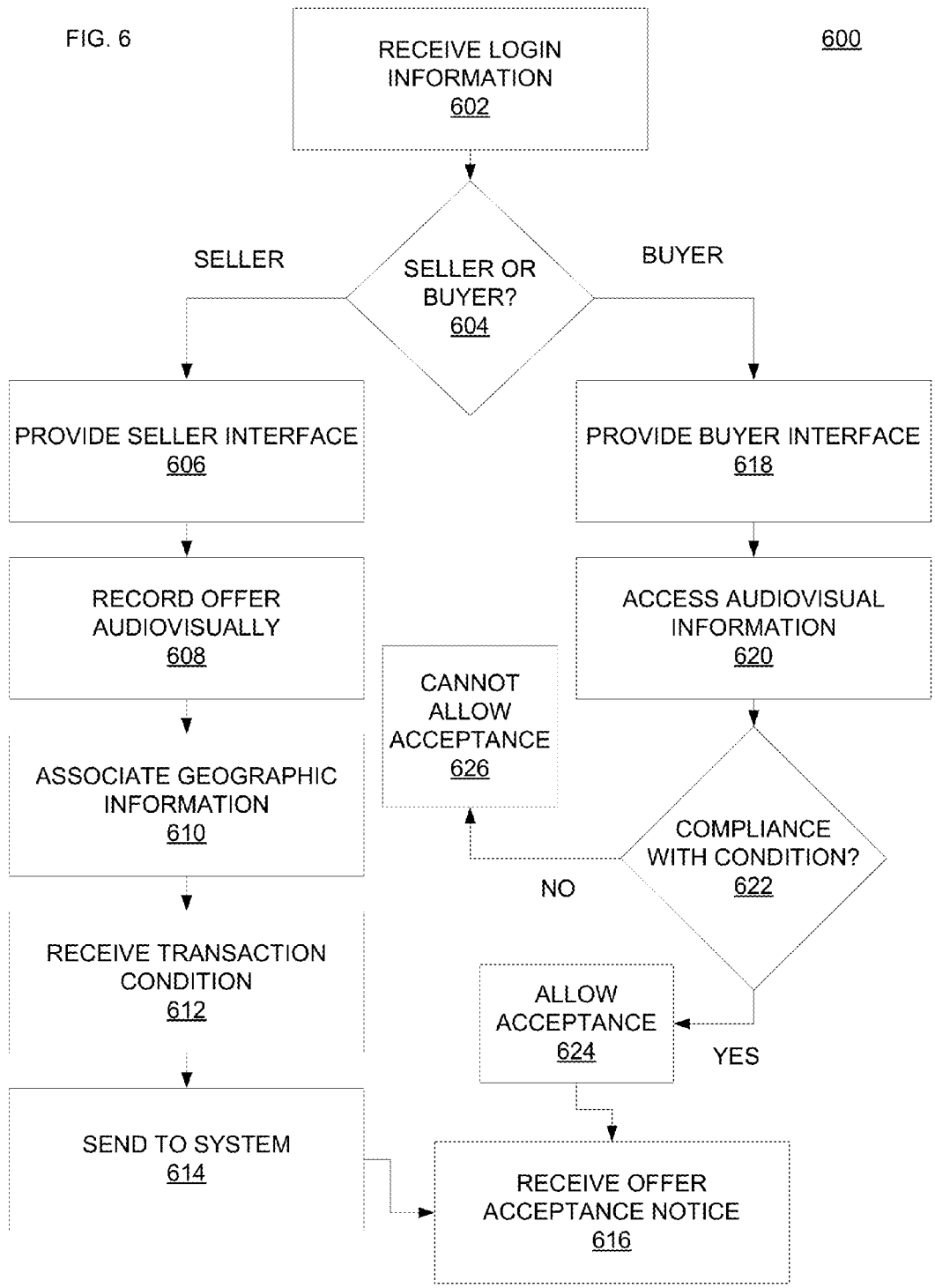

TECHNOLOGIES FOR VIDEO-BASED COMMERCE

CROSS-REFERENCE TO RELATED APPLICATIONS

The present application claims priority to U.S. Provisional Patent Application Ser. No. 61/865,130, filed on Aug. 12, 2013, which is herein fully incorporated by reference for all purposes.

TECHNICAL FIELD

Generally, the present disclosure relates to computing. More particularly, the present disclosure relates to video-based commerce.

BACKGROUND

In the present disclosure, where a document, an act and/or an item of knowledge is referred to and/or discussed, then such reference and/or discussion is not an admission that the document, the act and/or the item of knowledge and/or any combination thereof was at the priority date, publicly available, known to the public, part of common general knowledge and/or otherwise constitutes prior art under the applicable statutory provisions; and/or is known to be relevant to an attempt to solve any problem with which the present disclosure is concerned with. Further, nothing is disclaimed.

A famous adage states that a picture is worth a thousand words. As such, a video can be said to be worth a multitude of pictures. Resultantly, a variety of video-based services have become prevalent, such as television, network streaming, and so forth. However, in commerce, such as business-to-business, consumer-to-consumer, or business-to-consumer, video-based services have not seen such prevalence. Therefore, there is a need for technologies for video-based commerce.

BRIEF SUMMARY

The present disclosure at least partially address at least one of the above. However, the present disclosure can prove useful to other technical areas. Therefore, the claims should not be construed as necessarily limited to addressing any of the above.

A system of one or more computers can be configured to perform particular operations or actions by virtue of having software, firmware, hardware, or a combination of them installed on the system that in operation causes or cause the system to perform the operations or the actions. One or more computer programs can be configured to perform particular operations or actions by virtue of including instructions that, when executed by a data processing apparatus, cause the apparatus to perform the operations or the actions.

One general aspect includes a computer system receiving audiovisual information, geographic information, and a seller term from a seller computer, the audiovisual information disclosing a seller offer at a seller location captured via the seller computer, the geographic information associated with the location, the audiovisual information associated with the geographic information, the system providing the audiovisual information to a buyer computer for an acceptance of the offer via the buyer computer, the system conditioning the acceptance upon the buyer computer being geographically positioned in compliance with the term based on the geographic information. Other embodiments of this aspect include corresponding computer systems, apparatus, and computer programs recorded on one or more computer storage devices, each configured to perform the actions of the methods.

One general aspect includes a method including: receiving, via a computer system, audiovisual media, geographic information, and a seller term from a seller computer, the audiovisual media disclosing a seller offer at a seller location captured via the seller computer, the geographic information associated with the location, the audiovisual media associated with the geographic information. The method also includes providing, via the system, the audiovisual media to a buyer computer for an acceptance of the offer via the buyer computer, where the providing is based on the buyer computer being geographically positioned in compliance with the term based on the geographic information. The method also includes conditioning, via the system, the acceptance upon the buyer computer being geographically positioned in compliance with the term based on the geographic information. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings illustrate example embodiments of the present disclosure. Such drawings are not to be construed as necessarily limiting the disclosure. Like numbers and/or similar numbering scheme can refer to like and/or similar elements throughout.

FIG. 6 shows a flowchart of an example embodiment of a software implemented process for video-based commerce according to the present disclosure.

DETAILED DESCRIPTION OF THE PREFERRED EMBODIMENTS

Figure 1:
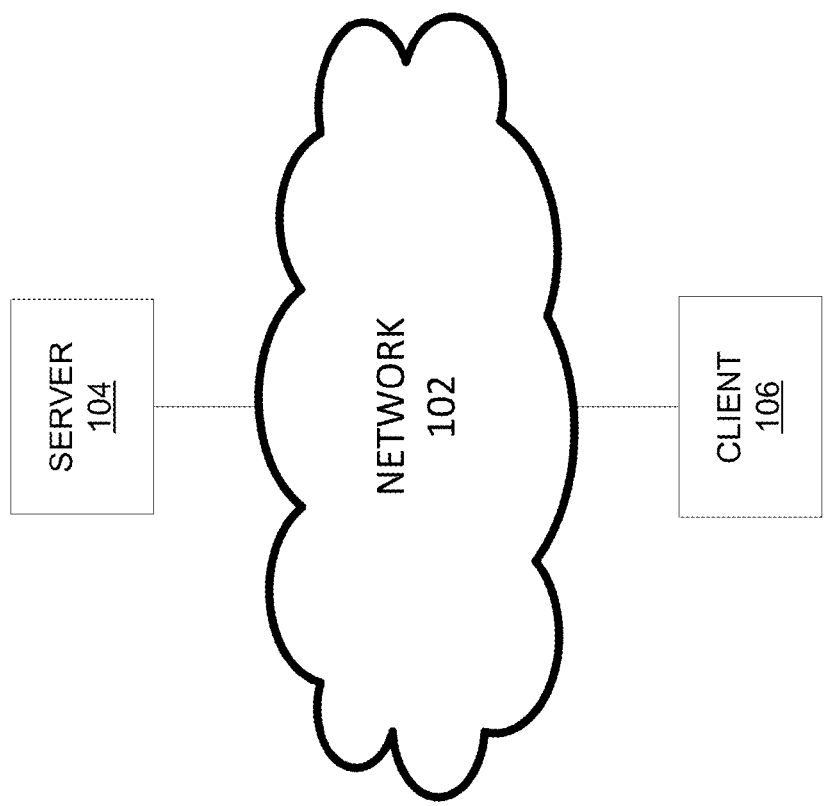
FIG. 1 shows a schematic view of an example embodiment of a computer network model according to the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art. In addition, features described with respect to certain example embodiments may be combined in and/or with various other example embodiments. Different aspects and/or elements of example embodiments, as disclosed herein, may be combined in a similar manner. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

As used herein, the term "about" and/or "substantially" refers to a +/−10% variation from the nominal value/term. Such variation is always included in any given value/term provided herein, whether or not such variation is specifically referred thereto.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

FIG. 1 shows a schematic view of an example embodiment of a computer network model according to the present disclosure. A computer network model 100 comprises a network 102, a server 104, and a client 106. Such distributed operation model allocates tasks/workloads between the server 104, which provides a resource/service, and the client 106, which requests the resource/service. The server 104 and the client 106 illustrate different computers/programs, but in other embodiments, the server 104 and the client 106 reside on one system. Further, in some embodiments, the model 100 entails allocating a large number of resources to a small number of computers, such as the servers 104, where complexity of the client 106 depends on how much computation is offloaded to the number of computers, i.e., more computation offloaded from the clients 106 leads to thinner clients 106, such as being more reliant on network sources.

The network 102 includes a plurality of nodes, such as a collection of computers and/or other hardware interconnected by communication channels, which allow for sharing of resources and/or information. Such interconnection can be direct and/or indirect. Network 102 can be wired and/or wireless. Network 102 can allow for communication over short and/or long distances. Network 102 can operate via at least one network protocol, such as Ethernet, a Transmission Control Protocol (TCP)/Internet Protocol (IP), and so forth. Network 102 can have any scale, such as a personal area network, a local area network, a home area network, a storage area network, a campus area network, a backbone network, a metropolitan area network, a wide area network, an enterprise private network, a virtual private network, a virtual network, a satellite network, a computer cloud network, an internetwork, a cellular network, and so forth. Network 102 can be and/or include an intranet and/or an extranet. Network 102 can be and/or include Internet. Network 102 can include other networks and/or allow for communication with other networks, whether sub-networks and/or distinct networks, whether identical and/or different from network 102. Network 102 can include hardware, such as a network interface card, a repeater, a hub, a bridge, a switch and/or a firewall. Network 102 can be operated, directly and/or indirectly, by and/or on behalf of one and/or more entities, irrespective of any relation to contents of the present disclosure.

The server 104 can be hardware-based and/or software-based. The server 104 is hosted on a computer, whether stationary or mobile, such as a kiosk, a workstation, a vehicle, whether land, marine, or aerial, a desktop, a laptop, a tablet, a mobile phone, a mainframe, a supercomputer, a server farm, and so forth. The computer can be touchscreen enabled and/or non-touchscreen. The computer can include and/or be a part of another computer system and/or cloud network. The computer can run any type of operating system (OS), such as iOS®, Windows®, Android®, Unix®, Linux® and/or others. The computer can include and/or be coupled to an input device, such as a mouse, a keyboard, a camera, whether forward-facing and/or back-facing, an accelerometer, a touchscreen, and/or a microphone, and/or an output device, such as a display, a speaker, a headphone, a joystick, a videogame controller, and/or a printer. The computer can include circuitry for global positioning determination, such as via a global positioning system (GPS), a signal triangulation system, and so forth. The computer can be equipped with near-field-communication (NFC) circuitry. The computer can run or be coupled to a database, such as a relational database, which can feed data to the server 104.

The server 104, via the computer, is in communication with network 102, such as directly and/or indirectly, selectively and/or unselectively, encrypted and/or unencrypted. Such communication can be via a software application, a mobile app, a browser, an OS, and/or any combination thereof. For example, such communication can be via a common framework/application programming interface (API), such as Hypertext Transfer Protocol Secure (HTTPS).

The client 106 can be hardware-based and/or software-based. The client 106 is hosted on a computer, whether stationary or mobile, such as a terminal, a kiosk, a workstation, a vehicle, whether land, marine, or aerial, a desktop, a laptop, a tablet, a mobile phone, a mainframe, a supercomputer, a server farm, and so forth. The computer can be touchscreen enabled and/or non-touchscreen. The computer can include and/or be a part of another computer system and/or cloud network. The computer can run any type of OS, such as iOS®, Windows®, Android®, Unix®, Linux® and/or others. The computer can include and/or be coupled to an input device, such as a mouse, a keyboard, a camera, whether forward-facing and/or back-facing, an accelerometer, a touchscreen, and/or a microphone, and/or an output device, such as a display, a speaker, a headphone, a joystick, a videogame controller, and/or a printer. The computer can include circuitry for global positioning determination, such as via a GPS, a signal triangulation system, and so forth. The computer can be equipped with NFC circuitry. The computer can run or be coupled to a database, such as a relational database, which can feed data to the client 106.

The client 106, via the computer, is in communication with network 102, such as directly and/or indirectly, selectively and/or unselectively, encrypted and/or unencrypted. Such communication can be via a software application, a mobile app, a browser, an OS, and/or any combination thereof. For example, such communication can be via a common framework/API, such as HTTPS. In other embodiments, the server 104 and the client 106 can also directly communicate with each other, such as when hosted in one system or when in local proximity to each other, such as via a short range wireless communication protocol, such as infrared or Bluetooth®. Since many of the clients 106 can initiate sessions with the server 104 relatively simultaneously, in some embodiments, the server 104 employs load-balancing technologies and/or failover technologies for operational efficiency, continuity, and/or redundancy.

Note that other computing models are possible as well. For example, decentralized computing, such as peer-to-peer (P2P), for instance Bit-Torrent®, or distributed computing, such as via computer clustering where a set of networked computers works together such that the computer can be viewed as a single system.

Figure 2:
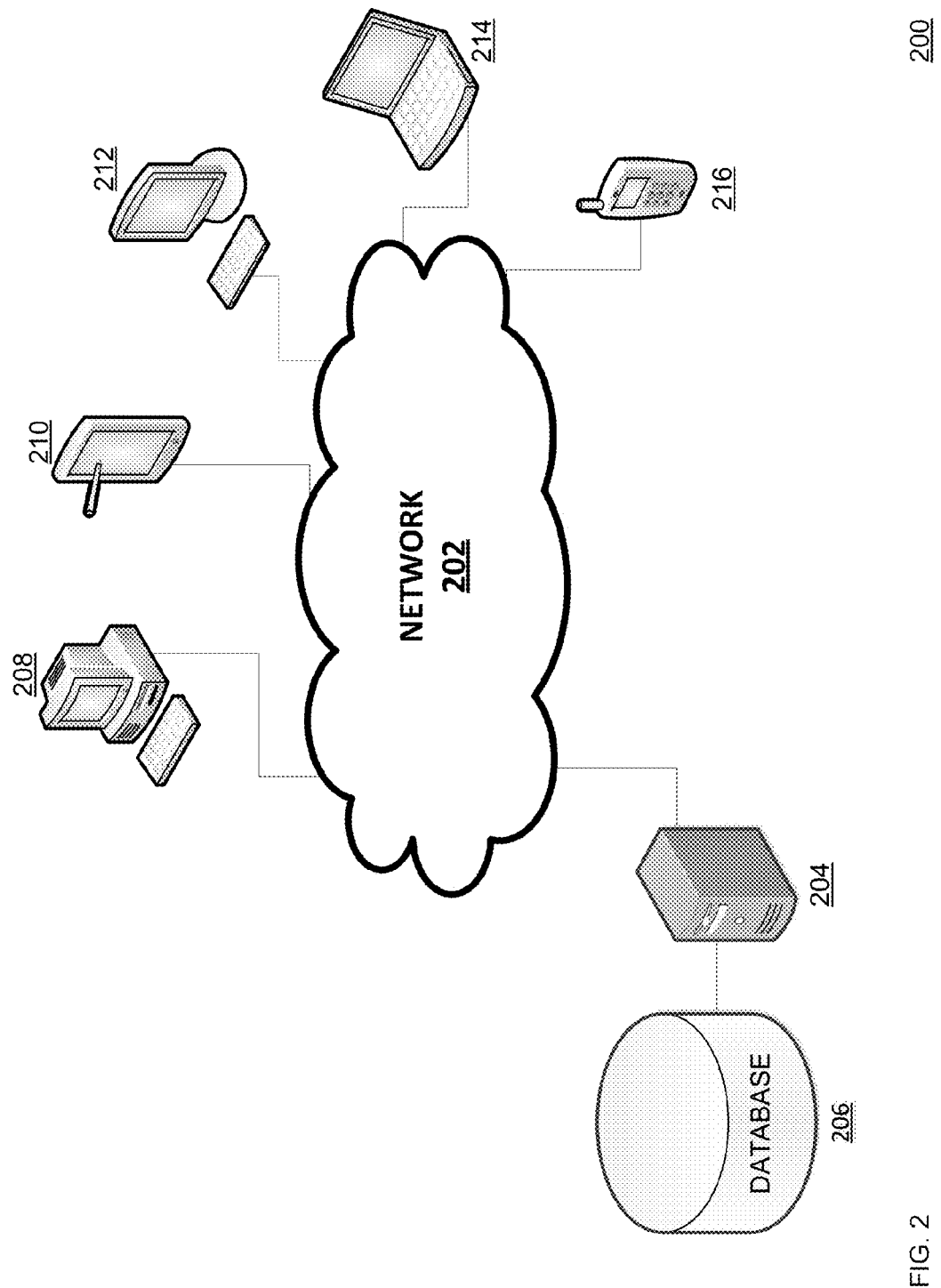
FIG. 2 shows a schematic view of an example embodiment of a computer network architecture according to the present disclosure.

FIG. 2 shows a schematic view of an example embodiment of a computer network architecture according to the present disclosure. A computer network architecture 200 comprises a network 202 in communication with a service provider segment and with a service requester segment. The service provider segment comprises a server computer 204 and a database 206. The service requester segment comprises a workstation computer 208, a tablet 210, a desktop computer 212, a laptop computer 214, and a mobile phone 216. The architecture 200 operates according to the model 100, but other computing models are possible, as described herein. The network 202 operates according to the network 102, but other network types are possible, as described herein.

The computer 204 is in communication with the network 202, such as directly and/or indirectly, wired and/or wireless, selectively and/or unselectively, encrypted and/or unencrypted. The computer 204 facilitates such communication via a hardware unit, as a hardware component of the computer 204, or a software unit, such as a software application, a mobile app, a browser, an OS, and/or any combination thereof. For example, such communication can be via a common framework/API, such as HTTPS. Due to a size of the service requester segment, the computer 204 employs load-balancing technologies and/or failover technologies for operational efficiency, continuity, and/or redundancy.

The computer 204 is operably coupled to the database 206 such that the computer 204 is in communication with the database 206, such as directly and/or indirectly, wired and/or wireless, selectively and/or unselectively, encrypted and/or unencrypted. The computer 204 facilitates such communication via a hardware unit, as a hardware component of the computer 204, or a software unit, such as a software application, a mobile app, a browser, an OS, and/or any combination thereof. For example, such communication can be via a common framework/API, such as HTTPS, employed via a database management system (DBMS) running on the computer 204, such as MySQL®, Oracle®, or other suitable systems.

The database 206 comprises an organized collection of data. For example, the data comprises audiovisual information and geographic information. The database 206 is accessed via the computer 206, such as via the DBMS running on the computer 206. The database 206 is a relational database, but other database models are possible, such as post-relational. Note that although the computer 204 and the database 206 are distinctly positioned from each other, in other embodiments, the computer 204 hosts the database 206. Note that the computer 204 and the database 206 are operated via a single actor, but in other embodiments, the computer 204 and the database 206 are operated via different actors.

The workstation computer 208, the tablet 210, the desktop computer 212, the laptop computer 214, and the mobile phone 216 are in communication with the network 202, such as directly and/or indirectly, wired and/or wireless, selectively and/or unselectively, encrypted and/or unencrypted. In any combinatory manner, the workstation computer 208, the tablet 210, the desktop computer 212, the laptop computer 214, and the mobile phone 216 facilitate such communication via a hardware unit, as a hardware component of the workstation computer 208, the tablet 210, the desktop computer 212, the laptop computer 214, and the mobile phone 216, or a software unit, such as a software application, a mobile app, a browser, an OS, and/or any combination thereof. For example, such communication can be via a common framework/API, such as HTTPS. Further, note that other types of service requesters are possible, such as a standalone camera, an automated teller machine (ATM), a crypto-currency miner, a kiosk, a terminal, a wearable computer, such as an eyewear computer, or other suitable devices.

Note that at least two of the workstation computer 208, the tablet 210, the desktop computer 212, the laptop computer 214, and the mobile phone 216 can communicate via the network 202 concurrently and/or non-concurrently, in an identical manner and/or in a different matter. Further, note that the workstation computer 208, the tablet 210, the desktop computer 212, the laptop computer 214, and the mobile phone 216 are operated via different actors, but in other embodiments, at least two of the workstation computer 208, the tablet 210, the desktop computer 212, the laptop computer 214, and the mobile phone 216 are operated via a single actor.

The service provider segment serves data via the network 202 to the service requester segment. Such serving can be via push technology and/or pull technology. For example, the push technology enables request initiation via the service provider segment, such as via the computer 204. Resultantly, periodically updateable information can be pushed via the computer 204, such as via synchronous conferencing, messaging, and/or file distribution, onto the service requester segment. Also, for example, the pull technology enables request initiation via the service requester segment, such as via the mobile phone 216. Resultantly, information can be pulled via the mobile phone 216, such as via web browsing, and/or web feeding, from the service provider segment.

Figure 3:
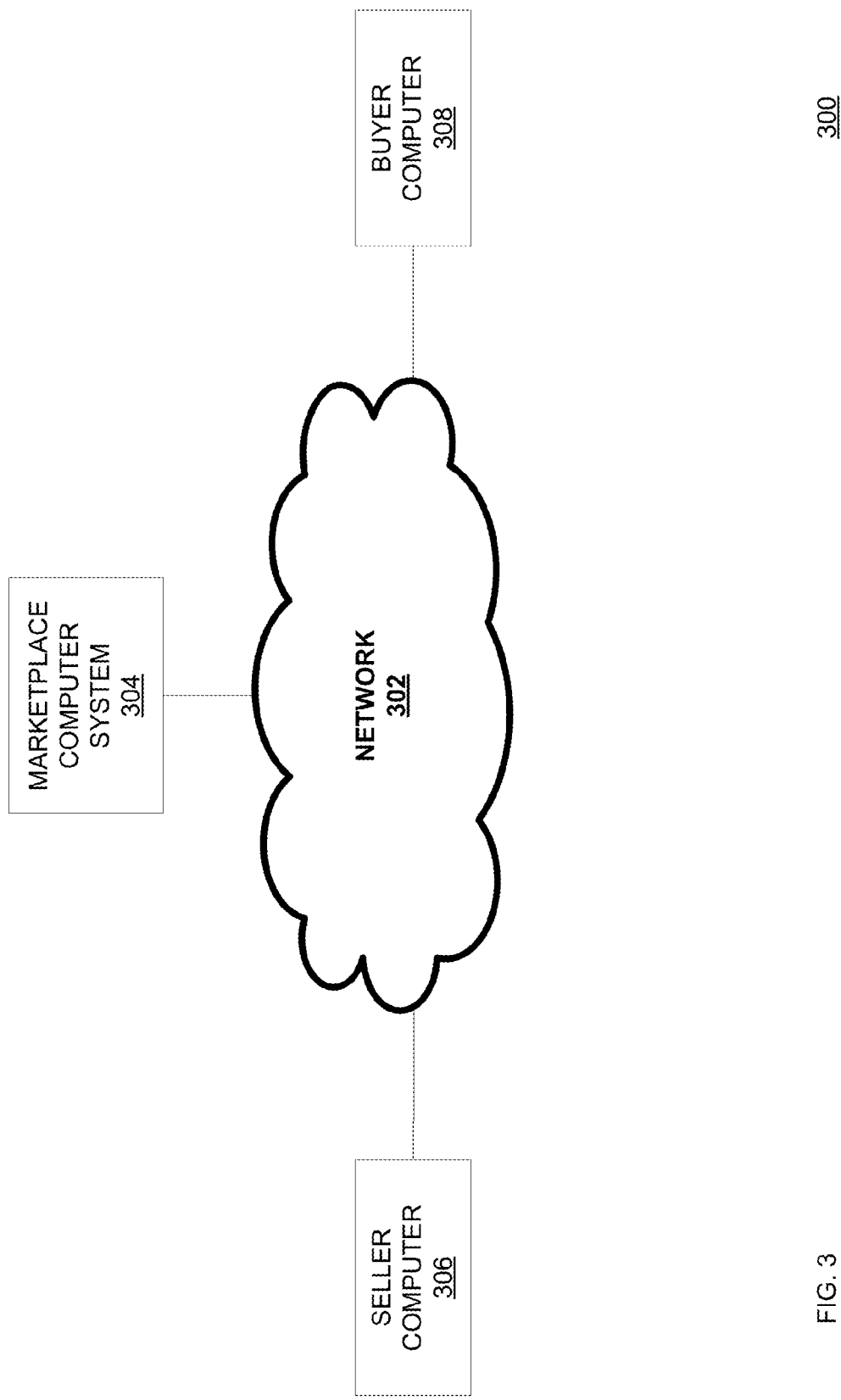
FIG. 3 shows a schematic view of an example embodiment of a computer network diagram according to the present disclosure.

FIG. 3 shows a schematic view of an example embodiment of a computer network diagram according to the present disclosure. A computer network diagram 300 comprises a network 302, a marketplace computer system 304, a seller computer 306, and a buyer computer 308. The network 302 operates according to the network 202, but other network types are possible, as described herein. The service provider segment comprises the system 304, which functions as a network-based marketplace, such as for Internet-based sales and/or auctions. The system 304 is in communication with the network 302, as described herein. The service requester segment comprises the seller computer 306, such as the desktop computer 212, and the buyer computer 308, such as the mobile phone 216. The seller computer 306 and the buyer computer 308 are in communication with the network 302, as described herein.

In one mode of operation, a seller operates the seller computer 306, such as the desktop computer 212, and lists a good/service for sale/auction, via the seller computer 306, on the system 304, based on communication via the network 302. A buyer operates the buyer computer 308, such as the mobile phone 216, and accesses the system 304, via the buyer computer 308, based on communication via the network 302. The buyer, via the buyer computer 308, purchases the good/service, via the system 304, from the seller, who is notified of such via the system 304 communicating with the seller computer 306.

Figure 4:
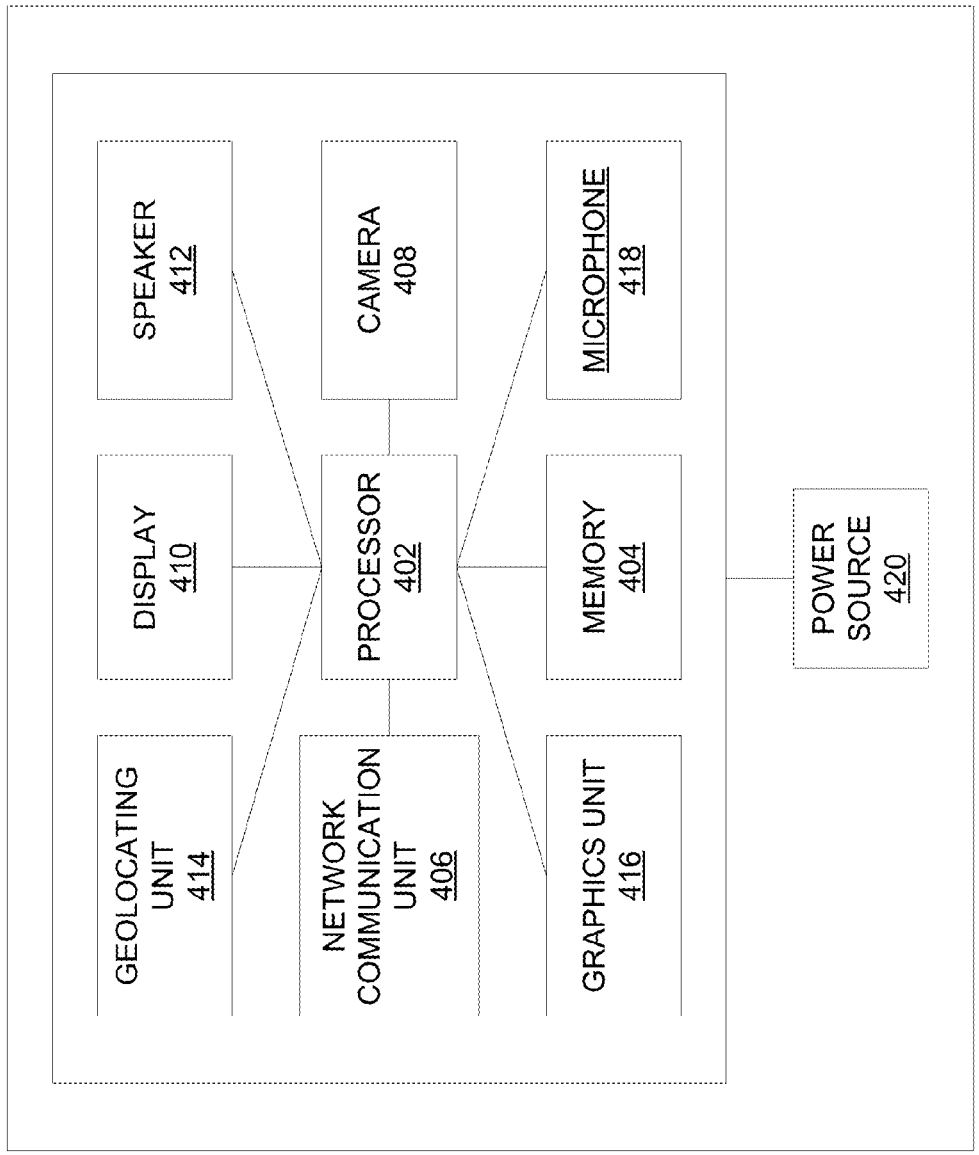
FIG. 4 shows a schematic view of an example embodiment of a computer according to the present disclosure.

FIG. 4 shows a schematic view of an example embodiment of a computer according to the present disclosure. A computer 400 comprises a processor 402, a memory 404 operably coupled to the processor 402, a network communication unit 406 operably coupled to the processor 402, a camera 408 operably coupled to the processor 402, a display 410 operably coupled to the processor 402, a speaker 412 operably coupled to the processor 402, a geolocating unit 414 operably coupled to the processor 402, a graphics unit 416 operably coupled to the processor 402, and a microphone 418 operably coupled to the processor 402. The computer 400 comprises a power source 420, which powers the processor 402, the memory 404, the network communication unit 406, the camera 408, the display 410, the speaker 412, the geolocating unit 414, the graphics unit 416, and the microphone 418. Although at least two of the processor 402, the memory 404, the network communication unit 406, the camera 408, the display 410, the speaker 412, the geolocating unit 414, the graphics unit 416, the microphone 418, and power source 420 are embodied in one unit, at least one of the processor 402, the memory 404, the network communication unit 406, the camera 408, the display 410, the speaker 412, the geolocating unit 414, the graphics unit 416, the microphone 418, and power source 420 can be operably coupled to the computer 400 when standalone, such as locally or remotely, directly or indirectly. Further, in other embodiments, the computer 400 lacks at least one of the network communication unit 406, the camera 408, the display 410, the speaker 412, the geolocating unit 414, the graphics unit 416, and the microphone 418.

The processor 402 comprises a hardware processor, such as a multicore processor. For example, the processor 402 comprises a central processing unit (CPU).

The memory 404 comprises a computer-readable storage medium, which can be non-transitory. The medium stores a plurality of computer-readable instructions, such as a software application, for execution via the processor 402. The instructions instruct the processor 402 to facilitate performance of a method for video-based commerce, as described herein. Some examples of the memory 404 comprise a volatile memory unit, such as random access memory (RAM), or a non-volatile memory unit, such as a read only memory (ROM). For example, the memory 404 comprises flash memory. The memory 404 is in wired communication with the processor 402. Also, for example, the memory 402 stores a plurality of computer-readable instructions, such as a plurality of instruction sets, for operating at least one of the network communication unit 406, the camera 408, the display 410, the speaker 412, the geolocating unit 414, the graphics unit 416, and the microphone 418.

The network communication unit 406 comprises a network interface controller for computer network communication, whether wired or wireless, direct or indirect. For example, the network communication unit 406 comprises hardware for computer networking communication based on at least one standard selected from a set of Institute of Electrical and Electronics Engineers (IEEE) 802 standards, such as an IEEE 802.11 standard. For instance, the network communication unit 406 comprises a wireless network card operative according to a IEEE 802.11(g) standard. The network communication unit 406 is in wired communication with the processor 402.

The camera 408 comprises a lens for image capturing, such as a photo or a video. The camera 408 stores a captured image on the memory 404, which can be in a compressed format or an uncompressed format. The camera 408 can allow image display on the display 410, such as before image capture or after image capture. The camera 408 can comprise a flash unit. The camera 408 can allow for zooming, whether optical or software based. The display 408 is in wired communication with the processor 402. The camera 408 can also be remotely coupled to the processor 402, such as wirelessly.

The display 410 comprises an area for displaying visual and/or tactile information. The display 410 comprises at least one of an electronic visual display, a flat panel display, a liquid crystal display (LCD), and a volumetric display. For example, the display 410 comprises a touch-enabled computer monitor. The display 410 is in wired communication with the processor 402. The display 410 can also be remotely coupled to the processor 402, such as wirelessly.

The speaker 412 comprises a loudspeaker, such as an electroacoustic transducer providing sound responsive to an electrical audio signal input. For example, the speaker 412 is a dynamic speaker. The speaker 412 is in wired communication with the processor 402. The speaker 412 can also be remotely coupled to the processor 402, such as wirelessly.

The geolocating unit 414 comprises a GPS receiver. The geolocating unit 414 is in communication with the processor 402. Note that other types of geolocation are possible, such as via cell site signal triangulation. The geolocating unit 414 can also be remotely coupled to the processor 402, such as wirelessly.

The graphics unit 416 comprises a graphics processing unit (GPU) for image processing. The graphics unit 416 is a graphics dedicated unit, but in other embodiments, the processor 402 is integrated with the graphics unit 416. For example, the graphics unit 416 comprises a video card. The graphics unit 416 is in wired communication with the processing unit 102.

The microphone 418 comprises an acoustic-to-electric transducer/sensor operative to convert sound in air into an electrical signal for subsequent use, such as output via the speaker 412. The microphone 418 can be electromagnetic induction based, capacitance change based, or piezoelectric based. The microphone 418 can be coupled to a preamplifier upstream from an audio power amplifier. For example, the microphone 418 is a dynamic microphone. The microphone 418 can also be remotely coupled to the processor 402, such as wirelessly.

The power source 420 powers the computer 400. The power source 420 comprises at least one of an onboard rechargeable battery, such as a lithium-ion battery, and an onboard renewable energy source, such as a photovoltaic cell or a hydropower turbine. Note that such power can be via mains electricity, such as via a power cable.

Note that the computer 400 can be operably coupled to at least one input device, such as a computer keyboard, a computer mouse, a track-pad, or other suitable input devices. Likewise, the computer 400 can be operably coupled to at least one output device, such as a printer, a projector, or other suitable output devices. Further, at least one of the computer 204, the workstation computer 208, the tablet 210, the desktop computer 212, the laptop computer 214, and the mobile phone 216 can be built according to the computer 400 schematic.

Figure 5:
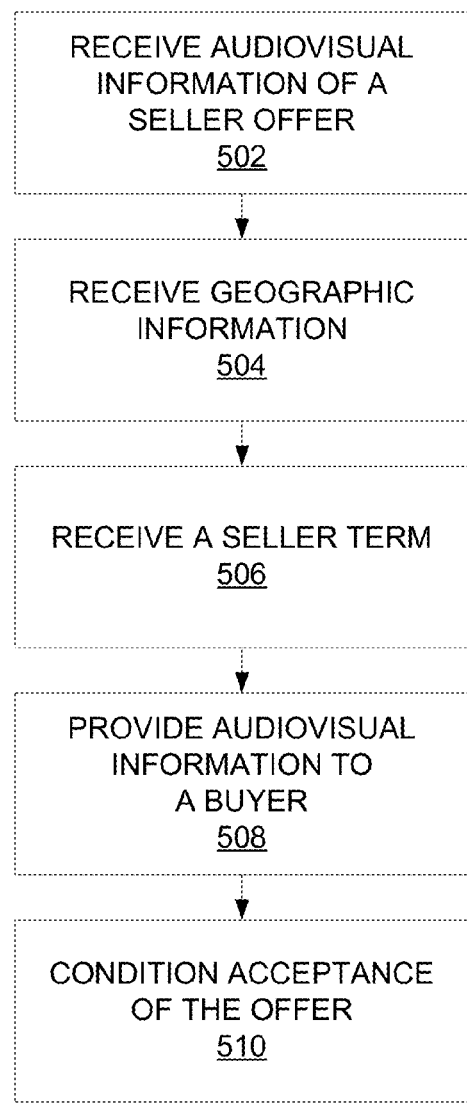
FIG. 5 shows a flowchart of an example embodiment of a method for video-based commerce according to the present disclosure.

FIG. 5 shows a flowchart of an example embodiment of a method for video-based commerce according to the present disclosure. A process 500 comprises a plurality of blocks 502-510. The process 500 can be performed in sequential numerical order and/or non-sequential numerical order. The process 500 is performed via the system 304. Whether domestically and/or internationally, the process 500 can be performed, facilitated for performance, and/or assisted in such performance via at least one actor, such as the system 304.

In block 502, the system 304 receives audiovisual information of a seller offer. The system 304, such as via the computer 204, receives the audiovisual information from the seller computer 306, such as via email, text message, bit stream, HTTP protocol, HTTPS protocol, file transfer protocol (FTP), a file, chat, social network post, streaming, stream recording, file extraction, content extraction, contextual processing, phone call, videoconference, a hyperlink, or via another suitable manner. For example, the system 304 receives, via the HTTPS protocol, the audiovisual information from a mobile app running on the seller computer 306, such as the tablet computer 210. The system 304 hosts the audiovisual information for access by the buyer computer.

The audiovisual information comprises a media stream and/or a media file containing audio content and video content, which can be synchronized to each other. Alternatively, the audiovisual information comprises a media stream and/or a video file and an audio file for association with and/or associated with the video file, such as via user input. The audiovisual information, such as the video content, can contain a plurality of subtitles based on the audio content.

The audiovisual information discloses, such as via the video content or the audio content, the seller offer made at a seller location captured via the seller computer 306. The seller offer comprises a seller demonstrating at least one good, such as a musical instrument, a vehicle, a clothing item, a furniture item, or a computer, at least one commodity, such as a cotton bale or diesel fuel, at least one service, such as legal services, medical services, plumbing services, catering services, audio content services, video content services, or accounting services, or at least one real property, such as land or a building. For example, the seller offer can comprise an invitation to an event or a reference to a movie or an event, such as a ticket. For another example, the seller offer can comprise a song or a speech or an act for sale as a service, where the seller is offering an admission to intake/partake in/access the song, the speech or the act. The seller offer comprises a description, such as an appearance, an operation, a condition, a price, a delivery date, a pick up date, a term of payment, or other suitable characteristics. The seller location can be at a dorm room, an apartment, a museum, a detached house, a garage, a den, an office building, a cubicle, a warehouse, a street, a plaza, a lot, a field, a public transportation spot, a vehicle, whether land, aerial, or marine, or other suitable location, whether indoors or outdoors, whether stationary or mobile. The seller is captured via the seller computer 306, such as via the camera 408 or the microphone 418 based on user input to initiate or continue such capture. In another embodiment, the audiovisual information is an introductory video introducing the seller to the buyer.

In block 504, the system 304 receives geographic information. The system 304, such as via the computer 204, receives the geographic information from the seller computer 306, such as via email, text message, bit stream, HTTP protocol, HTTPS protocol, fax, FTP, chat, social network post, streaming, a file, stream recording, file extraction, content extraction, contextual processing, phone call, videoconference, a hyperlink, or via another suitable manner. For example, the system 304 receives, via the HTTPS protocol, the geographic information from a mobile app running on the seller computer 306, such as the tablet computer 210. The system 304 hosts the geographic information for processing, as described herein.

The geographic information is associated with the seller location. The geographic information comprises a set of geographic coordinates, such as longitude, latitude, or elevation, for example as about 40N and 74W for New York City, or more granular when relevant. The set can be based on standardized coordinate system, open source data, or proprietary coordinate system. The set can be global based, country based, or localized to a specific area. Alternatively, the set comprises a proximal street address, such as 25 Main Street Flushing N.Y., or Four Park Avenue New York, a proximal landmark, such as a restaurant, a museum, a statue, a building, or a proximal urban planning unit, such as a garden or a park.

The audiovisual information is associated with the geographic information, such as via geotagging. Such association can be manual, such as local, based on a user touch input into the display 410, or remote, based on a user input into the system 304, such as via a mobile app running on the seller computer 306.

Such association can also be automatic, whether local on the seller computer 306 or remote from the seller computer 306 on the system 304. For example, the association can occur local via the seller computer 306. More particularly, before, during, or after, whether immediately thereafter or not immediately thereafter, audiovisual content capture of the demonstration of the seller offer via the camera 408 and the microphone 418, the geolocating unit 414 obtains current geographic information, such as based on communication with a GPS satellite or a cell site. The seller computer 306, via the processor 402, tags, such as automatically, the audiovisual information with the geographic information. Therefore, the seller computer 306 knows that the audiovisual information was captured at the seller location, such as a seller apartment, associated with the geographic information. The seller computer 306 sends the audiovisual information, as tagged with the geographical information, to the system 304.

Also, for example, the association can occur remote from the seller computer 306 on the system 304. More particularly, before, during, or after, whether immediately thereafter or not immediately thereafter, audiovisual content capture of the demonstration of the seller offer via the camera 408 and the microphone 418, the geolocating unit 414 obtains current geographic information, such as based on communication with a GPS satellite or a cell site. The seller computer 306 communicates the current geographic information to the system 304, such as via email, text message, bit stream, HTTP protocol, HTTPS protocol, fax, a file, FTP, chat, social network post, streaming, stream recording, file extraction, content extraction, contextual processing, phone call, videoconference, a hyperlink, or via another suitable manner. The system 304 tags, such as automatically, the audiovisual information with the geographic information. Therefore, the system 304 knows that the audiovisual information was captured at the seller location, such as a seller apartment, associated with the geographic information.

In other embodiments, the system 304 or the seller computer 306 can obtain the geographic information from the audiovisual information. For example, the system 304 or the seller computer 306 can process the audio content and/or the video content, such as via computer vision, for relevant clues/contextual information, whether personalized or generic, whether one-dimensional or multidimensional, such as keywords, accents, signs, language, images, sounds, or other relevant clues/contextual information, extract meaning from the clues/contextual information, comparing the meaning against a knowledge database, which can comprise at least one of various geographic information for famous locations, language information, sound information, image information, historical information, news information, financial information, medical information, event information, urban environment information, sports information, restaurant information, store information, transportation information, military information, police information, and governmental information, and determine the geographic information based on such comparison. Note for redundancy/accuracy, the system 304 can check on a result obtained via the seller computer 306.

Note that if the geographic information, as obtained via the geolocating unit 414, is changing during audiovisual information capture via the camera 408 and the microphone 418, such as via a seller positioned in a moving vehicle or a seller movement about an area, then the processor 402 can tag the audiovisual information based on a latest geographical information obtained via the geolocating unit 414, such as automatically upon conclusion of the audiovisual information capture via the camera 408 and the microphone 418. The processor 204 can also tag the audiovisual information based on an average between an audiovisual information capture starting geographical position, as obtained via the geolocating unit 414, and an audiovisual information capture ending geographical position, as obtained via the geolocating unit 414. The processor 402 can also tag the audiovisual information based on the audiovisual information capture starting geographical position, as obtained via the geolocating unit 414. The processor 402 can also tag the audiovisual information based on the audiovisual information capture ending geographical position, as obtained via the geolocating unit 414.

In block 506, the system 304 receives a seller term. The system 304, such as via the computer 204, receives the term from the seller computer 306, such as via email, text message, bit stream, HTTP protocol, HTTPS protocol, fax, FTP, a file, chat, social network post, streaming, stream recording, file extraction, content extraction, contextual processing, phone call, videoconference, a hyperlink, or via another suitable manner. For example, the system 304 receives, via the HTTPS protocol, the term from a mobile app running on the seller computer 306, such as the tablet computer 210. The system 304 hosts the term for processing, as described herein.

The term is obtained manually or automatically from the seller via the seller computer 306, whether locally or remotely. The term is obtained manually via a seller input into the seller computer 306, such as via typing, swiping, gesturing, touching, speaking, body movement, or other suitable user input. The term can also be obtained manually from another file selected by the seller via the seller computer 306. The term is obtained locally via the seller input into the seller computer 306. The term is obtained remotely via the seller computer 306 receiving the term from another computer, whether under control or not of the seller.

The term is obtained automatically based on a seller preference as understood via the system 304 or the seller computer 306 or a default setting provided via the system 304 or the seller computer 306. For example, the term can be obtained via the system 304 or the seller computer 306 performing contextual data/preference analysis, such as via email message analysis, text message analysis, social network analysis, typing pattern analysis, local photo/video/audio analysis, selling pattern analysis, buying pattern analysis, geolocation analysis, or other suitable contextual characteristic analysis.

In other embodiments, the term is provided in the audio content and/or the video content of the audiovisual information or the audiovisual information via the seller computer 306. The system 304, the seller computer 306, or the buyer computer 308 processes the audio content and/or the video content, such as via computer vision, of the audiovisual information or the audiovisual information, extracts meaning based on such processing, and identifies the term based on such extraction. Such identification can be via speech analysis/processing modules or image analysis/processing modules, which can be local to or remote from the system 304, the seller computer 306, or the buyer computer 308. For example, such identification can be keyword based, key phrase based, body movement based, head movement based, or image based.

The seller term discloses information based on which the seller is interested in transacting, such as via a sale and/or an auction, in accordance with the seller offer, as audiovisually disclosed, through the seller computer 306. The term discloses information assessed/measured/evaluated from the seller location based on the geographical information associated with the audiovisual information. For example, the term can comprise a distance, such as a range or a radius assessed/measured/evaluated from the seller location based on the geographic information associated with the audiovisual information. Therefore, the seller can geographically limit with whom the seller will transact. Resultantly, if the buyer computer 308 is outside of such distance, then the buyer is unable to transact with the seller via the buyer computer 308. Some benefits of such limiting comprise lower shipping fees, more revenue, and quicker delivery. For example, the term can also comprise a demographic component, such as via a presence of the buyer computer 308 in an area associated with a seller selected demographic segment, such as via a mobile application running on the seller computer 306. Some examples of such segment are based on at least one of a population density, a crime rate, an age, a gender, an education level, an income level, a marital status, an occupation, an ethnicity, a religion, a birth rate, a death rate, an average size of a family, and an average age at marriage. For example, the seller may prefer to transact with the buyer when the buyer computer is geographically positioned in an upscale neighborhood, such as transacting luxury goods, or in an area with a low crime rate, such as via providing personal purchase delivery, or a neighborhood with certain ethnicity to avoid language/culture barriers, such as transacting culture specific goods, or an area with a high birth rate, such as transacting baby goods, or a neighborhood with a high death rate, such as transacting burial services or a neighborhood with a high age, such as via providing geriatric services, or an area with high population density, such as transacting based on volume. Further, note the transaction can be based on any type of sale or any type of auction, such an English auction, a Dutch auction, a buyout auction, a reserve auction, or other suitable auction type.

In other embodiments, the system 304 or the seller computer 306 can enforce a transactional perimeter, such as a radius, which encloses an area around the seller location based on the geographic information in accordance with the term, where a size or a shape of the perimeter changes automatically based on local demographic information, as obtained from the system 304, the seller computer 306, or a remote data source, such as a governmental database. Therefore, the seller can transact via the seller computer 306 with the buyer computer 308 being within the perimeter. For example, if the seller location is in New York City, then the system 304 or the seller computer 306 might provide a 0.5 mile circular radius in comparison to the seller who lives in South Dakota who might receive a 5 mile oval radius because of a decrease in population density.

In block 508, the system 304 provides the audiovisual information to a buyer. The system 304, such as via the computer 204, provides the audiovisual information to the buyer computer 308, such as via email, text message, bit stream, HTTP protocol, HTTPS protocol, file transfer protocol (FTP), a file, chat, social network post, streaming, stream recording, file extraction, a file, content extraction, contextual processing, phone call, videoconference, a hyperlink, or via another suitable manner. For example, the system 304 streams, via the HTTPS protocol, the audiovisual information to a mobile app running on the buyer computer 308, such as the mobile phone 216. Based on such provision, the buyer, via the buyer computer 308, is able to access the seller offer from the system 304, such as by listening the audio content and/or seeing the video content, and determine whether the buyer desires to accept the seller offer via the buyer computer 308. In some embodiments, such provision is geographically unlimited, such as the buyer computer 308 can be geographically positioned anywhere or without a geographical limit. However, in other embodiments, such provision is geographically limited, such as the system 304 providing the audiovisual information based on the buyer computer 308 being geographically positioned in compliance with the seller term based on the geographic information. For example, the system 304 provides the audiovisual information to the buyer computer 308 based on the buyer computer 308 being within a certain distance of the seller location as provided via the term based on the geographic information and the system 304 avoids providing the audiovisual information to the buyer computer 308 based on the buyer computer 308 being outside of that certain distance. Further, in yet other embodiments, the system 304 provides the audiovisual information to the buyer computer 308, whether within that certain distance or outside of that certain distance, yet the buyer computer 308 avoids accessing the audiovisual information if outside of that certain distance or provides a notification to the buyer via the buyer computer 308, where the notification notifies the buyer that the buyer computer 308 is outside of that certain distance or outside of the seller's transactional range.

At least one of the system 304, the seller computer 306, and the buyer computer 308 can be configured such that the buyer, via the buyer computer 308, can accept the offer through the audiovisual information, such as user input during audio output or visual output. Such acceptance can lead to a purchase based on the offer, whether with or without a shopping cart functionality, such as based on the buyer's payment information being previously stored in the database 206 and accessible via the computer 204. Note that the system 304 can enable escrow functionality, where the acceptance, such as through the audiovisual information via the buyer computer 308, leads to a buyer payment and a seller-buyer meeting in-person, such as via providing seller or buyer contact information via the seller computer 306 or the buyer computer 308 or via provision of a commercial carrier/courier delivery tracking number. At the meeting, in accordance with the term based on the geographical information, the buyer is already charged based on the payment information on file, yet the seller gets paid on delivery, via the buyer operating the buyer computer 308, based on the buyer being satisfied that the good is in accordance with the audiovisual information, as provided to the buyer computer 308.

Such acceptance can also lead to a seller-buyer personal meeting, where consideration is exchanged, such as cash for the good upon delivery, such as in accordance with the term based on the geographical information. Note that to reduce fraud, the buyer or the seller can rate each other based on ease of scheduling, timeliness to arrive to the meeting, no-show rate, the good being in different condition than shown, or other suitable characteristics.

Such acceptance can lead to a direct purchase, such as without the shopping cart functionality, via the system 304, through the buyer computer 308 based on the seller offer. The acceptance can be performed in several ways. The acceptance can be based on playing the audio content and/or the video content, such as via displaying the audiovisual information, via the buyer computer 308 and a performance of a single action by the buyer via the buyer computer 308 during the playing. For example, the buyer can operate the buyer computer 308 to start streaming the audiovisual information from the system 304 such that the audiovisual information is output on the buyer computer 308, such as via the display 410 and the speaker 412. During such output, the buyer performs a single action via the buyer computer 308. The action can be any buyer interaction with and/or input into the buyer computer 308, such as touching the buyer computer 308, tapping the buyer computer 308, vibrating the buyer computer 308, shaking the buyer computer 308, squeezing the buyer computer 308, pressing a button on the buyer computer 308, speaking into the buyer computer 308, singing into the buyer computer 308, humming into the buyer computer 308, winking into the buyer computer 308, buyer head movement as detected via the buyer computer 308, buyer body movement as detected via the buyer computer 308, buyer hand motions via the buyer computer 308, or any other suitable single action. Note that for the single action, the buyer computer 308 can comprise any components thereof or a body of the computer 308. For example, the single action can based on at least one of a vocal input via the buyer computer 308, a touch input via the buyer computer 308, a gesture input via the buyer computer 308, a motion input via the buyer computer 308, a vibration input via the buyer computer 308, and a shake input via the buyer computer 308.

Note that the system 304 can be configured to receive an indication from the buyer computer 308. Such receipt is via at least one of an email, a text message, a bit stream, a HTTP protocol, a HTTPS protocol, a fax, a FTP, a file, a chat, a social network post, a streaming, a stream recording, a file extraction, a content extraction, a contextual processing, a phone call, a videoconference, a hyperlink, or via another suitable manner. For example, the system 304 receives, via the HTTPS protocol, the indication from a mobile app running on the buyer computer 308, such as the tablet computer 210. The indication is indicative of a display of the visual content of the audiovisual information or the audiovisual information via the buyer computer 308 and the acceptance via the buyer computer 308 based on the buyer single action via the buyer computer 308 performed during the display. Further, note that the system 304 can be configured that the single action directly purchases the good without the shopping cart functionality through the system 304 based on the seller offer.

Another way the acceptance can be performed entails playing the audio content and/or the video content, such as displaying the audiovisual information, via the buyer computer 308, presenting a visual element within the visual content or the audiovisual information via the buyer computer 308, and a performance of a single action involving the element, such as element activation, by the buyer via the buyer computer 308 during the playing. The element can be an image, a symbol, a hyperlink, a button, a checkbox, a dropdown, a widget, a tab, an icon, a shape, a line, an alphanumeric, a color segment, or any other suitable visual element. The element can be of any shape, such as a square, a rectangle, a circle, a triangle, or any other suitable shape. The element can be of any size sufficiently large to be buyer visible yet still allow for playing of the video content via the buyer computer 308.

The element is activated via the single action. The action can be any buyer interaction with and/or input into the buyer computer 308, such as touching the buyer computer 308, tapping the buyer computer 308, vibrating the buyer computer 308, shaking the buyer computer 308, squeezing the buyer computer 308, pressing a button on the buyer computer 308, speaking into the buyer computer 308, singing into the buyer computer 308, humming into the buyer computer 308, winking into the buyer computer 308, buyer head movement as detected via the buyer computer 308, buyer body movement as detected via the buyer computer 308, buyer hand motions via the buyer computer 308, or any other suitable single action. Note that for the single action, the buyer computer 308 can comprise any components thereof or a body of the computer 308. For example, the single action can based on at least one of a vocal input via the buyer computer 308, a touch input via the buyer computer 308, a gesture input via the buyer computer 308, a motion input via the buyer computer 308, a vibration input via the buyer computer 308, and a shake input via the buyer computer 308.

Such element can be placed into the visual content via the system 304, such as via video content element overlay or video content element insertion/embedding, whether manually or automatically, whether upon a selected position, whether by the buyer or the seller, a random position, or a default position. Such element can be placed into the visual content via the seller computer 306, such as via video content element overlay or video content element insertion, whether manually or automatically, whether upon a selected position, whether by the buyer or the seller, a random position, or a default position. Such element can be placed into the visual content via the buyer computer 308, such as via video content element overlay or video content element insertion, whether manually or automatically, whether upon a selected position, whether by the buyer or the seller, a random position, or a default position.

Note that the system 304 can be configured to receive an indication from the buyer computer 308. Such receipt is via at least one of an email, a text message, a bit stream, a HTTP protocol, a HTTPS protocol, a fax, a FTP, a file, a chat, a social network post, a streaming, a stream recording, a file extraction, a content extraction, a contextual processing, a phone call, a videoconference, a hyperlink, or via another suitable manner. For example, the system 304 receives, via the HTTPS protocol, the indication from a mobile app running on the buyer computer 308, such as the tablet computer 210. The indication is indicative of a display of the visual content of the audiovisual information or the audiovisual information via the buyer computer 308 and the visual element within the video content of the audiovisual information or the audiovisual information via the buyer computer 308. The acceptance via the buyer computer 308 is via the visual element being buyer single action activated via the buyer computer 308. For example, the acceptance via the buyer computer 308 can based on the buyer single action involving the visual element performed via the buyer computer 308 during the display. Further, note that the system 304 can be configured such that the visual element is single action activated by the buyer via the buyer computer 308, where such activation directly purchases the good, without the shopping cart functionality, through the system 304 based on the seller offer.

In other embodiments, the system 304 can un-provide, such as un-publish or make unavailable, the audio content and/or the video content of the audiovisual information or the audiovisual information from at least one of another potential buyer computer and the buyer computer 308 based on the acceptance. Therefore, the audio content and/or the video content of the audiovisual information or the audiovisual information are unavailable for others potential buyers to access. Such un-providing enables efficient data management/operations. Note that based on such un-providing, the audio content and/or the video content of the audiovisual information or the audiovisual information can be at least one of deleted from the system 304, compressed via the system 304 for archival on the system 304, and converted via the system 304 into a thumbnail for transaction history/records on the system 304, such as accessible via at least one of the seller computer 306 and the buyer computer 308.

In further embodiments, the system 304 can re-provide, such as re-publish or make available, the audio content and/or the video content of the audiovisual information or the audiovisual information to at least one of another potential buyer computer and the buyer computer 308 based on a revocation of the acceptance. Therefore, the audio content and/or the video content of the audiovisual information or the audiovisual information are once again available to others potential buyers for access. Such re-providing enables more efficient commerce, such as for another opportunity for the seller to transact via the seller computer 306 or another opportunity for the buyer to find what the buyer is seeking via the buyer computer 308. Such revocation occurs via the buyer computer 308, such as via a mobile app running on the buyer computer 308 and informing the system 304 of the revocation, for example, when the good delivered by the seller is in a different condition, such as a worse condition, than disclosed via the audio content or the video content of the audiovisual information or the audiovisual information, as accessed via the buyer computer 308.

In block 510, the system 304 conditions the acceptance upon the buyer computer 308 being geographically positioned in compliance with the term based on the geographic information. Such conditioning is via computer logic, whether hardware based or software based. Therefore, if the buyer computer 308 is positioned not in compliance with the term based on the geographic information, then system 304 or the buyer computer 308 precludes acceptance of the offer. Such positioning can be determined locally, such as via the buyer computer 308, or remotely, such as via the system 304, or both.

In other embodiments, the system 304 facilitates communication between the seller computer 306 and the buyer computer 308 over the network 302 based on the buyer computer 308 being geographically positioned in compliance with the term based on the geographic information, whether determined locally via the buyer computer 308 and/or remotely via the system 304. Examples of such communication include email, texting, chatting, social networking, phone calling, videoconferencing, audioconferencing, geo-tracking, navigational instructions, or other communication types. Therefore, the buyer, via the buyer computer 308, can communicate with the seller, via the seller computer 306, over the network 302 through the system 304 when the buyer computer is geographically positioned in compliance with the term based on the geographic information. If the buyer has a question about the offer, as disclosed via the audio content and/or the video content of the audiovisual information or the audiovisual information and accessed via the buyer computer 308, then the buyer can send the question to the seller for access via the seller computer 306. Similarly, upon the buyer computer 308 being geographically positioned in compliance with the term based on the geographic information and the acceptance of the offer, the seller and the buyer, such as via mutual approved request, track each other and locate/navigate to each other, such as for the good/service delivery/cash exchange, based on at least one of geo-tracking and navigational instructions provided to at least one of the seller computer 306 and the buyer computer 308. Upon approving of the good/service delivery/cash exchange, the system 304 can release the escrow funds, as described herein.

In other embodiments, the system 304 sends social network follow activity information, such as offer/transactional newsfeed, to the buyer computer 308, such as for informative display. Such activity is based on social following at least one user of the system 304, such as the seller. The activity information comprising a reference, such as a hyperlink, to the audio content and/or the video content of the audiovisual information or the audiovisual information based on the buyer computer 308 being geographically positioned in compliance with the term based on the geographic information, whether determined locally via the buyer computer 308 and/or remotely via the system 304. Therefore, the buyer, via the buyer computer 308, can follow multiple sellers, such as the seller via the seller computer 306, or other users via the system 304, wherein the follow activity information of the multiple sellers or the other users is fed to the buyer computer 308. Alternatively, the reference can also be provided based on the buyer computer 308 not being geographically positioned in compliance with the term based on the geographic information, yet the acceptance will not occur unless the buyer computer 308 is geographically positioned in compliance with the term based on the geographic information. Still alternatively, the reference can also be provided based on the buyer computer 308 not being geographically positioned in compliance with the term based on the geographic information, yet the reference being inactive unless the buyer computer 308 is geographically positioned in compliance with the term based on the geographic information. Note that the social networking functionality of the system 304 enables random users of the system 304, as signed up for use of the system 304, to comment on the good/service sale offers for view by other users, where the comments contain product feedback content, rumors, or other suitable information. Note that at least some of the random users do not have any association, whether social or transactional, with the good/service. Further, note that at least some of the users can form social groups via common interest/affiliation independent of making transactions, where the groups receive social networking notifications on relevant interest/affiliation. For example, at least some of the users can form a group around based on school affiliation independent of making transactions via the system 304, where the group receives social networking notifications on the goods/services transacted in school or in proximity of the school or in affiliation with the group, such as via being an alumni of the school. At least some members of the group can also post at least one of the good/service for transaction, via the system 304, as described herein.

In other embodiments, the buyer, via the buyer computer 308, can review the seller based on a quality of the audio content and/or the video content of the audiovisual information or the audiovisual information. Such reviews can be stored on the system 304 and can be private and/or public for encouraging the seller to provide the audio content and/or the video content of the audiovisual information or the audiovisual information of high quality, such as based on seller offer truthfulness, seller offer clarity, audio characteristics, video characteristics, or other suitable characteristics. For example, the system 304 can be configured to receive viewer review information for the audiovisual information from the buyer computer 308. Note that such review can be submitted via the buyer computer 308 being geographically positioned in compliance with said term based on said geographic information. Alternatively, such review can be submitted via the buyer computer 308 not being geographically positioned in compliance with said term based on said geographic information, such as after transacting with the seller.

In other embodiments, the system 304 or the seller computer 306 can be configured to help the seller to produce the audio content and/or the video content of the audiovisual information or the audiovisual information of high quality, such as based on seller offer truthfulness, seller offer clarity, audio characteristics, video characteristics, or other suitable characteristics. During a production of the audio content and/or the video content of the audiovisual information or the audiovisual information, the system 304 or the seller computer 306 can process audio and/or video input, as provided via the seller computer 306, for predetermined audio or video conditions. Then, still during the production, based on a presence of such conditions, the system 304 or the seller computer 306 visually provide the seller, via the computer 306, with real-time audiovisual quality feedback, such as via subtitles or on-display instructional labels. For example, when the seller computer 306 is the tablet 210 equipped with a frontal camera 408 and a frontal display 410, then during the production, as visually captured via the frontal camera 408, the display 410 can display in real-time visual feedback based on the visual capturing. The feedback can include instructions, such as seller movement instructions, like move away from a present position due to low contrast or poor lighting, seller body instructions, like smile or talk louder, good instructions, like state price clearly or differently or state good condition, or other suitable characteristics.

FIG. 6 shows a flowchart of an example embodiment of a software implemented process for video-based commerce according to the present disclosure. A process 600 comprises a plurality of blocks 602-624. The process 600 can be performed in sequential numerical order and/or non-sequential numerical order. The process 600 is performed via at least one of the seller computer 306 and the buyer computer 308. Whether domestically and/or internationally, the process 600 can be performed, facilitated for performance, and/or assisted in such performance via at least one actor, such as at least one of the seller computer 306 and the buyer computer 308.

In block 602, a software application running on at least one of the seller computer 306 and the buyer computer 308 receives user login information. Such information can be received via user input, such as via typing, gesturing, voice, picture, video, biometrics, or other suitable methodology. The application is a mobile app, but in other embodiments, the application is another type of application, such as a browser, a browser extension, or other suitable application, whether browser related or unrelated.

In block 604, the application determines whether the login information applies to the seller, such as a merchant, like a retail chain, or the buyer, such as an average consumer. If the login application applies to the seller, then block 606 is performed. Otherwise, block 618 is performed. Alternatively, the application prompts for a user input such that the user can select whether the user wants to sell or buy, such as when the user is an average consumer. If the user wants to sell, the block 606 is performed. Otherwise, block 618 is performed.

In block 606, the application provides a seller interface, which can allow for access and updating of contact information, payment information, offer information, auction information, media information, transaction history, or other relevant information.

In block 608, the application receives user input to record the seller offer audiovisually. Such input can be via typing, gesturing, or other suitable technology.

In block 610, the application associates the audiovisually recorded seller offer with current geographic information. Such association is via geotagging, which can be automatic.

In block 612, the application receives user input comprising to a transaction condition, such as the term. For example, the condition can include a distance, such as a radius, based off the geographic information, or a demographic selection, such as a crime rate, a population density, an income level, or other suitable demographic characteristics.

In block 614, the application sends the audiovisually recorded offer with associated geographical information to the system 304.

In block 616, the application receives an offer acceptance notice from the system 304. Such notice is received via at least one of an email, a text message, a bit stream, a HTTP protocol, a HTTPS protocol, a fax, a FTP, a file, a chat, a social network post, a streaming, a stream recording, a file extraction, a content extraction, a contextual processing, a phone call, a videoconference, a hyperlink, or via another suitable manner. Such notice is accepted based on the buyer computer 308 being geographically positioned in compliance with transaction condition based on the geographic information, as conditioned via the system 304.

In block 618, the application provides a buyer interface, which can allow for access and updating of contact information, payment information, offer information, auction information, watched media information, watch list, transaction history, or other relevant information.

In block 620, the application accesses the audiovisual information from the system 304.

In block 622, the application determines if the buyer computer 308 is compliant with the transaction condition. If compliant, then block 624 is performed. Otherwise, block 626 is performed.

In block 624, the application determines that the buyer computer 308 is compliant with the transaction condition and the offer is accepted if placed from the buyer computer 308, such as through the audiovisual information.

In block 626, the application determines that the buyer computer 308 is not compliant with the transaction condition and the offer cannot be placed via the buyer computer 308.

Figure 7A:
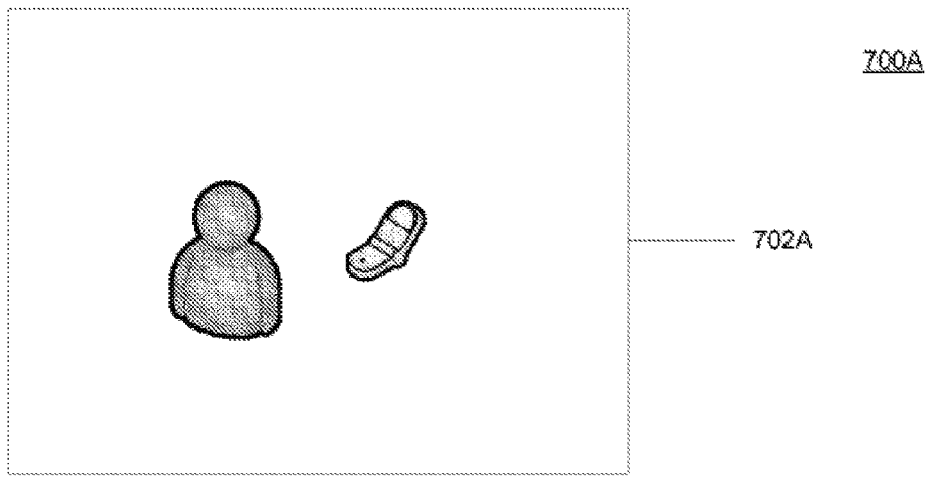
FIG. 7A shows a diagram of an example embodiment of a video content for single action activation according to the present disclosure.

FIG. 7A shows a diagram of an example embodiment of a video content for single action activation according to the present disclosure.

A screenshot 700A depicts a display 702A of the visual content of the audiovisual information. The visual content depicts a seller showing a good for sale, such as a cellular phone. The offer acceptance is based on the performance of the single action by the buyer via the buyer computer 308 during the playing of the display 702A. For example, the buyer can operate the buyer computer 308 to start streaming the audiovisual information from the system 304 such that the audiovisual information is output on the buyer computer 308, such as via the display 410 and the speaker 412, as depicted via the display 702. During such output, the buyer performs the single action via the buyer computer 308. The action can be any buyer interaction with and/or input into the buyer computer 308, such as touching the buyer computer 308, tapping the buyer computer 308, vibrating the buyer computer 308, shaking the buyer computer 308, squeezing the buyer computer 308, pressing a button on the buyer computer 308, speaking into the buyer computer 308, singing into the buyer computer 308, humming into the buyer computer 308, winking into the buyer computer 308, buyer head movement as detected via the buyer computer 308, buyer body movement as detected via the buyer computer 308, buyer hand motions via the buyer computer 308, facial expressions as detected via the buyer computer 308, or any other suitable single action. Note that for the single action, the buyer computer 308 can comprise any components thereof or a body of the computer 308, such as a case or a chassis. For example, the single action can based on at least one of a vocal input via the buyer computer 308, a touch input via the buyer computer 308, a gesture input via the buyer computer 308, a motion input via the buyer computer 308, a vibration input via the buyer computer 308, and a shake input via the buyer computer 308.

Figure 7B:
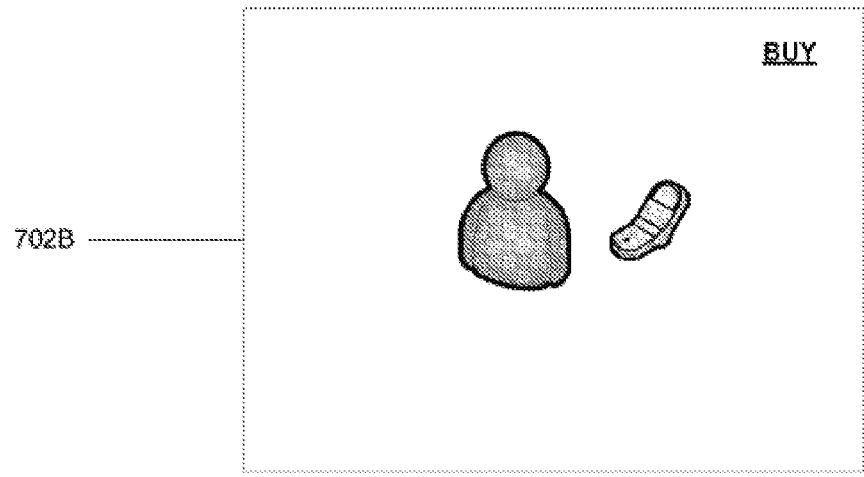
FIG. 7B shows a diagram of an example embodiment of a visual element within a video content for single action activation according to the present disclosure.

FIG. 7B shows a diagram of an example embodiment of a visual element within a video content for single action activation according to the present disclosure. A screenshot 700B depicts a display 702B of the visual content of the audiovisual information. The visual content depicts a seller showing a good for sale, such as a cellular phone, and the visual element in an upper right corner, which is a hyperlink or a button labeled as "BUY". The offer acceptance is based on presenting the visual element within the visual content or the audiovisual information via the buyer computer 308, and the performance of the single action involving the element, such as element activation, by the buyer via the buyer computer 308 during the playing, as depicted via the display 702B. The element can be an image, a symbol, a hyperlink, a button, a checkbox, a dropdown, a widget, a tab, an icon, a shape, a line, an alphanumeric, a color segment, or any other suitable visual element. The element can be of any shape, such as a square, a rectangle, a circle, a triangle, or any other suitable shape. The element can be of any size sufficiently large to be buyer visible yet still allow for playing of the video content via the buyer computer 308.

The element is activated via the single action. The action can be any buyer interaction with and/or input into the buyer computer 308, such as touching the buyer computer 308, tapping the buyer computer 308, vibrating the buyer computer 308, shaking the buyer computer 308, squeezing the buyer computer 308, pressing a button on the buyer computer 308, speaking into the buyer computer 308, singing into the buyer computer 308, humming into the buyer computer 308, winking into the buyer computer 308, buyer head movement as detected via the buyer computer 308, buyer body movement as detected via the buyer computer 308, buyer hand motions via the buyer computer 308, or any other suitable single action. Note that for the single action, the buyer computer 308 can comprise any components thereof or a body of the computer 308. For example, the single action can based on at least one of a vocal input via the buyer computer 308, a touch input via the buyer computer 308, a gesture input via the buyer computer 308, a motion input via the buyer computer 308, a vibration input via the buyer computer 308, and a shake input via the buyer computer 308.

Such element can be placed into the visual content via the system 304, such as via video content element overlay or video content element insertion, whether manually or automatically, whether upon a selected position, whether by the buyer or the seller, a random position, or a default position. Such element can be placed into the visual content via the seller computer 306, such as via video content element overlay or video content element insertion, whether manually or automatically, whether upon a selected position, whether by the buyer or the seller, a random position, or a default position. Such element can be placed into the visual content via the buyer computer 308, such as via video content element overlay or video content element insertion, whether manually or automatically, whether upon a selected position, whether by the buyer or the seller, a random position, or a default position.

In other embodiments, at least one of the system 304, the seller computer 306, and the buyer computer 308 processes the audio content and/or the video content of the audiovisual information or the audiovisual information, and determines an offering similar to the offer or the video content and/or the audio content of the audiovisual information or the audiovisual information. Therefore, the seller, via the seller computer 306, can be informed of other similar offerings such that the seller can be informed of how competitive the seller's offer is compared to others, while the buyer, via the buyer computer 308, can be informed of other similar offerings such that the buyer can obtain a low price. Such offering can be provided with the audiovisual information simultaneously or not, on demand or not. Further, the system 304, the seller computer 306, or the buyer computer 308 can provide the offering based on the buyer computer 308 being geographically positioned in compliance with the term based on the geographic information. Alternatively, such offering can be provided based on the buyer computer 308 not being geographically positioned in compliance with the term based on the geographic information, yet prohibit the acceptance until the buyer computer 308 not being geographically positioned in compliance with the term based on the geographic information.

In other embodiments, at least one of the system 304, the seller computer 306, and the buyer computer 308 processes the audio content and/or the video content of the audiovisual information or the audiovisual information, such as via audio processing module/software or computer vision module/software. At least one of the system 304, the seller computer 306, and the buyer computer 308 then generates a product/service/good/property listing, such as via robotic journalism software based on such processing. The listing can be alphanumeric or user searchable. Note that the audiovisual information provision can be based on such listing, where the listing includes a reference, such as a hyperlink to the audiovisual information. The listing can be available for a viewing by the buyer, via the buyer computer 308, based on the buyer computer 308 being geographically positioned in compliance with the term based on the geographic information. Further, note that at least one of the system 304, the seller computer 306, and the buyer computer 308 can be configured to create a plurality of subtitles for the audio content and/or the video content of the audiovisual information or the audiovisual information based on such processing.

In other embodiments, the system 304 hosts auction and/or sale software package. In the auction, the seller, via the seller computer 306, posts, on the system 304, a lowest amount that the seller is willing to receive for the good. There is no time duration for such auction. After the good is posted to the system 304, such as via the audiovisual information, the buyer bids, via the buyer computer 308, that at least meets the posted amount by the seller, such as a reserve price. The seller is notified, via the seller computer 306, and has an ability to end the auction at any time and take an offer, even if the offer is not a highest offer. Such notification is via at least one of an email, a text message, a bit stream, a HTTP protocol, a HTTPS protocol, a fax, a FTP, a file, a chat, a social network post, a streaming, a stream recording, a file extraction, a content extraction, a contextual processing, a phone call, a videoconference, a hyperlink, a message, or via another suitable manner. The seller has an option to take the highest offer or an offer with a lesser dollar amount that might seem more beneficial because of a closer geographical proximity of the buyer, based on the buyer computer 308 being geographically positioned in compliance with the term based on the geographic information. The bidder, such as the buyer, via the buyer computer 308, has an opportunity to retract the bid if the buyer sees another similar item the buyer want to purchase or simply is no longer interested in the good. There are also "Buy Now" capabilities if the buyer, or the seller wishes. Note that the auction and/or the sale software package running on the system 304 can be configured to enable the seller to select a bid from a plurality of bids, via the seller computer 306, where such selection is based on weighing a payment type, such as cash, crypto-currency, or payment card, a delivery manner, such as a personal delivery/pickup, or a shipping preference, a geographical proximity, such as a distance based on the geographic information, a term, such as a demographic segment, a social connection, such as a social network friend or follower, a group affiliation, such as a group member, as described herein, or other suitable characteristics, as provided to the seller on the seller computer 306. Such weighing can be manual, such as based on the seller sale preferences, as manually input into the seller computer 306. Such weighing can also be automatic, via the seller computer 306, based on previous sale preferences, historical information, payment information contextual information, email information, contact information, social network information, a payment type, such as cash, crypto-currency, or payment card, a delivery manner, such as a personal delivery/pickup, or a shipping preference, a geographical proximity, such as a distance based on the geographic information, a term, such as a demographic segment, a social connection, such as a social network friend or follower, a group affiliation, such as a group member, as described herein, or other suitable characteristics, available to the seller computer 306.

Note that the present disclosure applies to commerce, such as business-to-business, consumer-to-consumer, or business-to-consumer.

In still other embodiments, the system 304 can dispatch a courier or an unmanned vehicle, whether land, marine, or aerial, operated via an operator of the system 304 to pick up the purchased/won good from the seller, such as from the seller location or a current geolocation of the seller computer 306, and deliver the good to the buyer, such to a current geolocation of the buyer phone 308, as obtained via the system 304. Such delivery can be based on the buyer computer 308 being geographically positioned in compliance with the term based on the geographic information. Note that the courier or the unmanned vehicle can be funded/sponsored by the buyer or the seller or as a charge for using the system 304 or a flat fee.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

In some embodiments, an apparatus or system comprise at least one processor, and memory storing instructions that, when executed by the at least one processor, cause the apparatus or system to perform one or more methodological acts as described herein. In some embodiments, the memory stores data, such as one or more structures, metadata, lines, tags, blocks, strings, or other suitable data organizations.

As will be appreciated by one skilled in the art, aspects of this disclosure can be embodied as a system, method or computer program product. Accordingly, aspects of the present disclosure can take the form of an entirely hardware embodiment, an entirely software embodiment (including firmware, resident software, micro-code, etc.) or as embodiments combining software and hardware aspects that can all generally be referred to herein as a "circuit," "module" or "system." Furthermore, aspects of the disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific example (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, radiofrequency (RF), etc., or any suitable combination of the foregoing.

Computer program code for carrying out operations for aspects of the present disclosure can be written in any combination of one or more programming language, including an object oriented programming language, such as Java, Smalltalk, C++ or the like and conventional procedural programming language, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the steps can be performed in a differing order or steps can be added, deleted or modified. All of these variations are considered a part of the disclosure.

It will be understood that those skilled in the art, both now and in the future, can make various improvements and enhancements which fall within the scope of the claims which follow.

What is claimed is:

1. A system comprising:
a marketplace computer configured to:
receive a seller offer comprising a file and a distance term from a seller computer over a network, the distance term including an offer distance and a transactional range, the transactional range automatically changing based on demographic information related to an area encompassed by the transactional range,
wherein said seller computer includes a camera, a microphone, and a seller geolocating unit,
wherein said file includes both audiovisual information captured via said camera and said microphone, and geographic information automatically obtained from said seller geolocating unit while capturing said audiovisual information at a seller location,
wherein said audiovisual information discloses the seller offer made at said seller location,
wherein said file is automatically tagged by said seller computer before sending to said marketplace computer to include geographic information for said seller location automatically obtained via said seller geolocating unit while said seller offer is being created based at least in part on said audiovisual information being captured via said camera and said microphone at said seller location,
automatically store said seller offer in a database coupled to said marketplace computer,
provide said seller offer to a buyer computer over said network when said buyer computer is in compliance with the offer distance of said seller offer, wherein said buyer computer includes a display, a speaker, and a buyer geolocating unit, wherein said display and said speaker are configured to output said audiovisual information for a presentation of said seller offer when said buyer computer is in compliance with the offer distance of said seller offer,
receive an acknowledgement from said buyer computer over said network based at least in part on said presentation of said seller offer while said buyer computer is in compliance with the offer distance of said seller offer, wherein said acknowledgement expresses a buyer desire to buy in compliance with at least the transactional range of said distance term of said seller offer, wherein said acknowledgement includes buyer geolocation information automatically obtained via said buyer geolocating unit when sending said acknowledgement over said network,
determine whether said buyer computer is geographically positioned in compliance with the transactional range of said distance term of said seller offer based on said buyer geolocation information included in said acknowledgment,
convert said acknowledgement into an acceptance of said seller offer by the buyer based at least in part on compliance with the transactional range of said distance term of said seller offer,
wherein said acceptance is automatically communicated to said seller computer over said network; and
upon conversion of said acknowledgment into the acceptance, transfer payment from a buyer to an escrow account;
wherein the payment contained in the escrow account is released to a corresponding seller when the buyer and the seller meet in-person;
wherein the offer distance and the transactional range differ.

2. The system of claim 1, wherein said computer system is configured to:
receive a demographic segment term from said seller computer,
determine whether said buyer computer is geographically positioned in an area matching said demographic segment term based on said geolocation information, said geographic information read from said file, and said distance term, wherein said acceptance is based on said matching.

3. The system of claim 1, wherein said acknowledgement is generated automatically and sent automatically from said buyer computer based on at least one of:
a display of said audiovisual information via said buyer computer during said presentation and a buyer single action via said buyer computer performed during said display such that said acknowledgement is contemporaneously communicated to said computer system responsive to said buyer single action, or
a display of said audiovisual information via said buyer computer during said presentation and a visual element within said audiovisual information via said buyer computer, wherein said visual element being buyer single action activated via said buyer computer such that said acknowledgement is contemporaneously communicated to said computer system responsive to said buyer single action.

4. The system of claim 3, wherein said transfer of funds is based at least in part on a price disclosed in said presentation, receive an indication from said buyer computer when said buyer computer is geographically positioned in compliance with the distance term received from said seller computer to facilitate transacting based at least in part on said acceptance.

5. The system of claim 1, wherein said computer system is configured to un-provide said audiovisual information from at least one of another computer and said buyer computer based on said acceptance.

6. The system of claim 5, wherein said computer system is configured to re-provide said audiovisual information to at least one of said another computer and said buyer computer based on a revocation of said acceptance via said seller computer.

7. The system of claim 1, wherein said computer system is configured to facilitate communication between said seller computer and said buyer computer based on said buyer computer being geographically positioned in compliance with said distance term based on said geographic information and said geolocation information.

8. The system of claim 1, wherein said computer system is configured to send social follow activity information to said buyer computer, wherein said activity information comprising a reference to said audiovisual information hosted on said computer system based on said buyer computer being geographically positioned in compliance with said distance term based on said geographic information and said geolocation information.

9. The system of claim 1, wherein said computer system is configured to provide said audiovisual information to said buyer computer for said presentation based on said buyer computer being geographically positioned in compliance with said distance term based on said geographic information and said geolocation information.

10. The system of claim 1, wherein said computer system is configured to receive viewer review information for said audiovisual information from said buyer computer being geographically positioned in compliance with said distance term based on said geographic information and said geolocation information.

11. The system of claim 1, wherein said seller computer is configured to process said audiovisual information in real-time when said audiovisual information is captured via said camera and said microphone and provide an audiovisual quality feedback in real-time such that a quality of said audiovisual information can be improved in real-time.

12. The system of claim 1, wherein said computer system is configured to process said audiovisual information, to identify an offering similar to said seller offer, and to provide said offering to said buyer computer, wherein said offering is hosted on said computer system based on uploading via another seller computer.

13. The system of claim 12, wherein said offering is provided to said buyer computer based on said buyer computer being geographically positioned in compliance with said offer term based on said geographic information and said geolocation information.

14. The system of claim 1, wherein said computer system is configured to process said audiovisual information and to generate a listing automatically, wherein said listing is associated with said audiovisual information, said listing is alphanumerically searchable via said buyer computer.

15. The system of claim 14, wherein said computer system is configured to create a plurality of subtitles for said audiovisual information based on said processing.

16. The system of claim 1, said marketplace computer being further configured to extract terms from audio and/or video content contained in said audiovisual information, wherein said seller offer includes said extracted terms.

17. A system comprising:
a marketplace computer configured to:
receive a seller offer comprising a file and a distance term from a seller computer over a network, the distance term including an offer distance and a transactional range, the transactional range automatically changing based on demographic information related to an area encompassed by the transactional range,
wherein said seller computer includes a camera, a microphone, and a seller geolocation receiver,
wherein said file includes both audiovisual information captured via said camera and said microphone, and geographic information automatically obtained from said seller geolocation receiver while capturing said audiovisual information at a seller location,
wherein said audiovisual information presents a good subject to said seller offer, wherein said good is located at said seller location,
wherein said file is automatically tagged by said seller computer before sending to said marketplace computer to include first geographic information for said seller location automatically obtained via said seller geolocation receiver while said seller offer is being created based at least in part on said audiovisual information being captured via said camera and said microphone at said seller location,
automatically store said seller offer in a database coupled to said marketplace computer,
provide said seller offer to a buyer computer over said network when said buyer computer is in compliance with the offer distance of said seller offer wherein said buyer computer includes a display, a speaker, and a buyer geolocation receiver, wherein said display and said speaker are configured to output said audiovisual information for a presentation of said seller offer for said good when said buyer computer is in compliance with the offer distance of said seller offer,
receive an acknowledgement from said buyer computer over said network based at least in part on said presentation of said seller offer for said good while said buyer computer is in compliance with the offer distance of said seller offer, wherein said acknowledgement expresses a buyer desire to buy said good in compliance with at least the transactional range of said distance term of said seller offer, wherein said acknowledgement includes second geographic information automatically obtained via said buyer geolocation receiver at sending said acknowledgement over said network,
determine whether said buyer computer is geographically positioned in a compliance with the transactional range of said distance term of said seller offer based on said second geographic information included in said acknowledgment,
send a sale confirmation to said seller computer over said network, wherein said sale confirmation is based at least in part on said acknowledgement and said compliance with the transactional range of said distance term of said seller offer; and
upon sending of the sale confirmation, transfer payment from a buyer to an escrow;
wherein the payment contained in the escrow account is released to a corresponding seller when the buyer and the seller meet in-person;

wherein the offer distance and the transactional range differ.

18. The system of claim 17, wherein said computer system is configured to:
receive a demographic segment term from said seller computer,
determine whether said buyer computer is geographically positioned in an area matching said demographic segment term based at least in part on said first geographic information obtained from said file, said second geographic information, and said distance term, wherein said sale confirmation is based at least in part on said matching.

19. The system of claim 18, wherein said acknowledgement is generated automatically and sent automatically from said buyer computer based at least in part on a display of said audiovisual information via said buyer computer during said presentation and a buyer single action via said buyer computer performed during said display such that said acknowledgement is responsive to said buyer single action, wherein said buyer single action comprises at least one of a live vocal input into said buyer computer during said display or a shake of said buyer computer during said display, wherein said live vocal input enables a command to purchase immediately during said display.

20. The system of claim 19, wherein said transfer of funds is based at least in part on a price disclosed in said presentation.

21. The system of claim 20, wherein said computer system is configured to:
receive an indication from said buyer computer when said buyer computer is geographically positioned in compliance with the distance term received from said seller computer to facilitate transacting based at least in part on said sales confirmation.

22. The system of claim 17, said marketplace computer being further configured to extract terms from audio and/or video content contained ins aid audiovisual information, wherein said seller offer includes said extracted terms.

* * * * *